(12) United States Patent
Chen

(10) Patent No.: US 10,764,496 B2
(45) Date of Patent: Sep. 1, 2020

(54) FAST SCAN-TYPE PANORAMIC IMAGE SYNTHESIS METHOD AND DEVICE

(71) Applicant: ArcSoft Corporation Limited, Hangzhou (CN)

(72) Inventor: Ping Chen, Nanjing (CN)

(73) Assignee: ArcSoft Corporation Limited, Hangzhou (CN)

( * ) Notice: Subject to any disclaimer, the term of this patent is extended or adjusted under 35 U.S.C. 154(b) by 0 days.

(21) Appl. No.: 16/354,576

(22) Filed: Mar. 15, 2019

(65) Prior Publication Data

US 2019/0289207 A1  Sep. 19, 2019

(30) Foreign Application Priority Data

Mar. 16, 2018 (CN) .......................... 2018 1 0220580
Mar. 14, 2019 (CN) .......................... 2019 1 0192881

(51) Int. Cl.
*H04N 5/232* (2006.01)
*G06T 5/50* (2006.01)

(52) U.S. Cl.
CPC .......... *H04N 5/23238* (2013.01); *G06T 5/50* (2013.01)

(58) Field of Classification Search
CPC ........ H04N 5/2258; H04N 5/232; H04N 5/38; H04N 5/35545; G06T 2207/10144
See application file for complete search history.

(56) References Cited

U.S. PATENT DOCUMENTS

| | | | | |
|---|---|---|---|---|
| 7,239,805 B2 * | 7/2007 | Uyttendaele | .......... | G06T 3/4038 348/218.1 |
| 7,680,354 B2 * | 3/2010 | Mei | .......................... | G06T 5/50 348/208.4 |
| 7,840,067 B2 * | 11/2010 | Shen | .................... | H04N 1/3876 382/165 |
| 8,018,999 B2 * | 9/2011 | Yao | .......................... | G06T 5/50 348/208.13 |
| 8,275,215 B2 * | 9/2012 | Mei | ......................... | G06T 11/60 345/629 |
| 8,471,920 B2 * | 6/2013 | Georgiev | ............... | G03B 11/00 348/221.1 |

(Continued)

*Primary Examiner* — Brian P Yenke
(74) *Attorney, Agent, or Firm* — Osha Liang LLP

(57) ABSTRACT

The present invention discloses a fast scan-type panoramic image synthesis method and device. The device includes: simultaneously acquiring two original images of the same angle of view, wherein one is an exposure-locked image and the other is a non-exposure-locked image; performing HDR processing on the two simultaneously acquired original images by using the exposure-locked image as a reference image to obtain an HDR processed outcome image; performing exposure compensation on the HDR processed outcome image of the current frame based on the temporary panoramic outcome image of the previous frame; and performing image fusion and synthesis according to the temporary panoramic outcome image of the previous frame and the exposure compensated HDR processed outcome image of the current frame to generate a new temporary panoramic outcome image of the current frame. The present invention can effectively restore lost details in areas of over-exposure and under-exposure in the original images, thereby avoiding the issue of detail loss in a panoramic image caused by locked exposure.

15 Claims, 4 Drawing Sheets

(56) References Cited

U.S. PATENT DOCUMENTS

| | | | | |
|---|---|---|---|---|
| 8,600,194 | B2* | 12/2013 | Doepke | G06T 3/4038 345/36 |
| 8,866,920 | B2* | 10/2014 | Venkataraman | H04N 5/2253 348/218.1 |
| 8,908,055 | B2* | 12/2014 | Furumura | G06T 3/4038 348/218.1 |
| 8,933,985 | B1* | 1/2015 | Rapaport | G06T 3/4038 348/36 |
| 8,957,944 | B2* | 2/2015 | Doepke | H04N 5/23238 348/211.4 |
| 9,088,714 | B2* | 7/2015 | Doepke | H04N 5/23238 |
| 9,185,287 | B2* | 11/2015 | Sento | G03B 37/02 |
| 9,258,470 | B1* | 2/2016 | Zhou | H04N 5/2258 |
| 9,338,349 | B2* | 5/2016 | Sharma | H04N 5/23229 |
| 9,426,365 | B2* | 8/2016 | Laroia | G02B 27/58 |
| 9,521,321 | B1* | 12/2016 | Kozko | H04N 5/23238 |
| 9,762,794 | B2* | 9/2017 | Doepke | H04N 5/23238 |
| 9,979,884 | B2* | 5/2018 | Hirata | H04N 5/23245 |
| 10,068,317 | B2* | 9/2018 | Chen | G06T 5/002 |
| 2004/0201748 | A1* | 10/2004 | Goldstein | H04N 1/3873 348/231.99 |
| 2008/0050011 | A1* | 2/2008 | Ofek | G06T 17/05 382/154 |
| 2012/0027249 | A1* | 2/2012 | Brown | G06K 9/00771 382/103 |
| 2012/0293608 | A1* | 11/2012 | Doepke | H04N 5/23238 348/36 |
| 2012/0293609 | A1* | 11/2012 | Doepke | H04N 5/23238 348/36 |
| 2012/0293610 | A1* | 11/2012 | Doepke | H04N 5/23238 348/36 |
| 2012/0294549 | A1* | 11/2012 | Doepke | G06T 3/4038 382/294 |
| 2013/0229546 | A1* | 9/2013 | Furumura | G06T 5/50 348/229.1 |
| 2014/0071317 | A1* | 3/2014 | Yamagata | H04N 5/355 348/279 |
| 2015/0116453 | A1* | 4/2015 | Hirata | H04N 5/23245 348/38 |
| 2015/0373247 | A1* | 12/2015 | Boitard | H04N 5/23238 348/36 |
| 2016/0044241 | A1* | 2/2016 | Kaida | G06T 3/4038 348/36 |
| 2017/0034436 | A1* | 2/2017 | Inoue | H04N 5/247 |
| 2017/0132820 | A1* | 5/2017 | Zhou | G06K 9/6215 |
| 2017/0230577 | A1* | 8/2017 | Ishii | G06T 7/11 |
| 2018/0091734 | A1* | 3/2018 | Jinno | H04N 5/2355 |
| 2018/0152624 | A1* | 5/2018 | Li | H04N 5/23238 |
| 2018/0249148 | A1* | 8/2018 | Roulet | H04N 5/23238 |
| 2018/0302544 | A1* | 10/2018 | Dhiman | H04N 5/2353 |
| 2018/0365803 | A1* | 12/2018 | Xie | G06K 9/6202 |
| 2019/0124261 | A1* | 4/2019 | Toyoda | H04N 5/23238 |
| 2019/0281216 | A1* | 9/2019 | Masamura | H04N 5/23238 |

* cited by examiner

FAST SCAN-TYPE PANORAMIC IMAGE SYNTHESIS METHOD AND DEVICE

CROSS-REFERENCE TO RELATED APPLICATIONS

This application claims priority to Chinese Patent Application No. 201810220580.3, filed on Mar. 16, 2018, and Chinese Patent Application No. 201910192881.4, filed on Mar. 14, 2019, both of which are hereby incorporated by reference in their entirety.

BACKGROUND OF THE INVENTION

Field of the Invention

The present invention relates to the technical field of image processing, and more particularly to a fast scan-type panoramic image synthesis method and device based on high dynamic range (HDR) imaging preprocessing.

Description of the Prior Art

A panoramic image is a wide-angle image, which is synthesized from multiple images having narrower angles of view by using an algorithm. There are various approaches for panoramic image synthesis. For example, single images are first captured and synthesized by post-processing, or specific image blocks are captured for real-time synthesis during image capture, or dual fish-eye cameras are used to simultaneously capture two fish-eye images for synthesis.

There are numerous current smartphones pre-loaded with a fast scan-type panoramic image synthesis program. A user can tap on a "start capturing" key and hold the smartphone to move towards one direction, and a panoramic image can be immediately obtained after the above capturing. This image synthesis method mainly uses motion estimation. An image is selected by moving a small distance. A matching algorithm identifies the precise overlapping region between a selected image block and the previous image block in the middle region of the image. Using a fusion algorithm, the identified image blocks are stitched into a resulting image, and finally a panoramic image is formed by a large number of image blocks of the above type. The method can achieve real-time stitching, and a panoramic image can be immediately obtained after the capturing.

In the above type of fast panoramic image stitching algorithm, in order to enhance performance and to ensure stitching quality, exposure is usually locked when image data is collected, so as to eliminate a subsequent exposure compensation process. However, the approach of exposure locking in advance can easily cause issues of over-exposure and under-exposure in specific scenarios. For example, assume that a user starts capturing in an indoor area with normal exposure and moves towards a window. Because the exposure is locked, over-exposure is incurred as the exposure intensifies when the user approaches closer to the window, presenting a highly bright area without scenes outside the window, as shown in FIG. 1.

There are certain smartphones pre-loaded with a panoramic image capturing program. A user can tap on a "start capturing" key and hold the smartphone to move towards any desired direction to capture photographs of different directions. A background program then performs synthesis through an algorithm, and a panoramic image is then acquired only after waiting for a period of time subsequent to the end of the capturing. In this method, an image is captured for every predetermined distance through motion estimation, position relationships of the images are subsequently calculated through feature point matching, brightness and color differences are corrected by exposure compensation, and the images then undergo cylindrical or spherical transformation and are stitched into an outcome image by using a fusion algorithm. Such conventional panoramic stitching algorithm is slow in performance and can easily generate stitching dislocation for scenes having large differences in the depth of view. Moreover, because exposure is not locked, scenes with larger light differences are susceptible to errors in the exposure compensation algorithm, leading to odd-looking color blocks.

The present invention is primarily targeted to solve an issue of prior art, in which loss of image details in a panoramic outcome image caused due to exposure locking.

SUMMARY OF THE INVENTION

In view of the above, the present invention provides a fast scan-type panoramic image synthesis method and device. In a fast scan-type panoramic stitching method, high dynamic range (HDR) preprocessing on an input image sequence is added and an HDR processed result image is exposure compensated, thereby avoiding the issue of loss of image details in a panoramic outcome image caused by exposure locking.

A fast scan-type panoramic image synthesis method provided by the present invention includes steps of: simultaneously acquiring two original images of the same angle of view, wherein one is an exposure-locked image and the other is a non-exposure-locked image; performing high dynamic range (HDR) processing on the simultaneously acquired original image by using the exposure-locked image as a reference image to obtain an HDR processed outcome image of a current frame; performing exposure compensation on the HDR processed outcome image of the current frame based on a temporary panoramic outcome image of a previous frame; and performing image fusion and synthesis according to the temporary panoramic outcome image of the previous frame and the exposure compensated HDR processed outcome image of the current frame to generate a new temporary panoramic outcome image of the current frame.

Correspondingly, a fast scan-type panoramic image synthesis device provided by the present invention includes an original image acquiring module, a high dynamic range (HDR) preprocessing module, an exposure compensating module and an image synthesizing module.

The original image acquiring module simultaneously acquires two original images of the same angle of view, wherein one is an exposure-locked image and the other is a non-exposure-locked image.

The HDR preprocessing module performs HDR processing on the two simultaneously acquired original image by using the exposure-locked image as a reference image to obtain an HDR processed outcome image of a current frame.

The exposure compensating module performs exposure compensation on the HDR processed outcome image of the current frame based on a temporary panoramic outcome image of a previous frame.

The image synthesizing module performs image fusion and synthesis according to the temporary panoramic outcome image of the previous frame and the exposure compensated HDR processed outcome image of the current frame to generate a new temporary panoramic outcome image of the current frame.

Correspondingly, the present invention further provides a fast scan-type panoramic image synthesis device including a memory, a processor, and a computer program stored in the memory and executable on the processor. The steps of the above method are implemented when the processor executes the computer program.

Correspondingly, the present invention further provides a fast scan-type panoramic image synthesis device including a computer-readable storage medium having a computer program stored therein, and the steps of the above method are implemented when the computer program is executed by a processor.

Compared to the prior art, the present technical solution provides the following advantages.

In the fast scan-type panoramic image synthesis method and device of the present invention, HDR processing is performed by using an image obtained by an exposure locked camera as a reference image for an HDR algorithm, so as to maintain the consistency in brightness with an HDR processed outcome image of an adjacent frame. As such, a drawback of a conventional HDR algorithm, in which brightness inconsistency from an HDR outcome image of an adjacent frame is caused when one input image is selected as a reference image according to one evaluation standard, is overcome. Further, exposure compensation is performed on an HDR processed outcome image before image fusion to reduce a brightness discrepancy caused by the HDR processing. Lastly, image fusion and synthesis are performed according to a temporary panoramic outcome image of a previous frame and an exposure compensated HDR processed outcome image of a current frame to generate a new temporary panoramic outcome image of the current frame, thereby obtaining a final synthesized panoramic image. With the present invention, details lost in areas of over-exposure and under-exposure in an original image can be effectively recovered, so as to avoid the issues of loss of image details in a panoramic outcome image caused by locked exposure.

DETAILED DESCRIPTION OF THE EMBODIMENTS

The above and other technical features and advantages of the present invention are clearly and thoroughly described with the accompanying drawings below. It is obvious that the described embodiments are only some embodiments but not all of the embodiments of the present invention.

Figure 2:
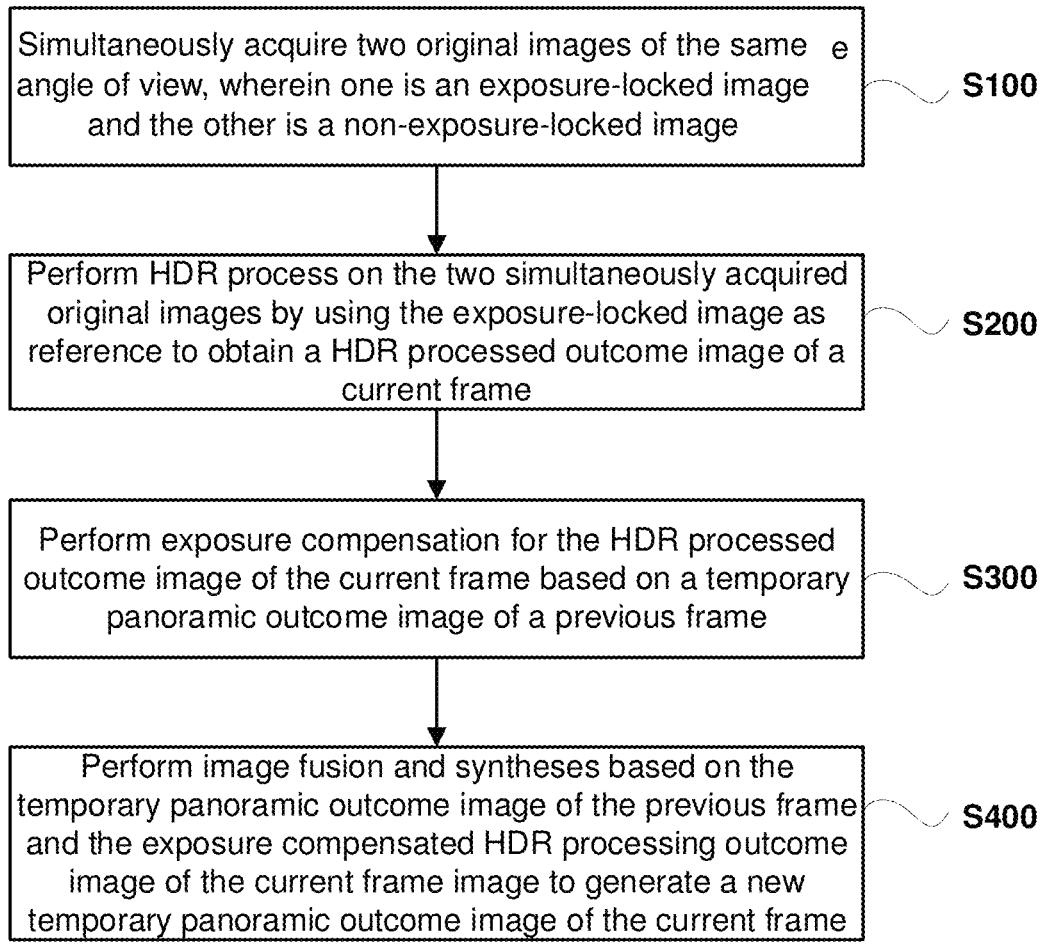
FIG. 2 is a flowchart of a fast scan-type panoramic image synthesis method provided according to a first embodiment of the present invention.

Referring to FIG. 2, a fast scan-type panoramic image synthesis method provided according to a first embodiment of the present invention includes steps of: S100, simultaneously acquiring two original images of the same angle of view, wherein one is an exposure-locked image and the other is a non-exposure-locked image; S200, performing high dynamic range (HDR) processing on the two simultaneously acquired original images by using the exposure-locked image as a reference image to obtain an HDR processed output image of a current frame; S300, performing exposure compensation on the HDR processed outcome image of the current frame based on the temporary panoramic outcome image of a previous frame; and S400, performing image fusion and synthesis according to the temporary panoramic outcome image of the previous frame and the exposure compensated HDR processed outcome image of the current frame to generate a new temporary panoramic outcome image of the current frame.

Step S100 can be implemented by controlling two cameras of the same angle of view to simultaneously acquire two original images, wherein one of the cameras is exposure-locked and the other camera is non-exposure-locked, and the two images are simultaneously acquired. Dual camera cellphones are currently very common, and so two original images of the same angle of view can be simultaneously acquired on the basis of a device such as an existing dual camera cellphone.

In step S200, the exposure-locked input image and the non-exposure-locked input image are simultaneously used as input images for an HDR algorithm, and HDR processing is performed by using the exposure-locked image as a reference image to obtain an HDR processed outcome image.

It should be noted that, in a conventional HDR algorithm, three input images having different exposure levels (low, normal and high exposure levels) are generally adopted. However, because only one camera is used, the three images are sequentially acquired rather than simultaneously acquired. In this embodiment, the image acquired by the exposure-locked camera is used as a reference image for the HDR algorithm, that is, the exposure-locked image is used as a normal-exposure image, thereby maximizing the brightness consistency between the HDR processed outcome image and the exposure-locked image. Further, the brightness discrepancy between adjacent frames is extremely small when the exposure is locked. Thus, when HDR processing is performed by using exposure-locked images as normal-exposure images, the brightness consistency between HDR processed outcome images of adjacent frames can be maintained. As such, the drawback of the conventional HDR algorithm, in which brightness inconsistency between HDR outcome images of adjacent frames caused when one input image is selected as a reference image according to one evaluation standard, is overcome.

In the HDR algorithm adopted in the first embodiment, the exposure-locked image is set as a normal-exposure image, and an area with detail loss or abnormal exposure is identified using the algorithm by using this image as a reference image, so as to restore the exposure-locked image. The brightness of the HDR processed outcome image is closest to that of the exposure-locked image by a similarity level over 80%, thereby restoring the details originally lost in the areas of over-exposure and under-exposure.

Figure 1:
FIG. 1 is a panoramic image in a background technology of the present invention.
Figure 3:
FIG. 3 is a synthesized panoramic image generated by a fast scan-type panoramic image synthesis method provided according to the first embodiment of the present invention.

According to embodiments of the present invention, the HDR processed outcome image with the locked reference image is used as an input image for synthesis to generate a panoramic image, exposure compensation is performed before image fusion to reduce the brightness discrepancy caused by HDR processing, and image fusion and synthesis are lastly performed according to the temporary panoramic outcome image of the previous frame and the exposure compensated HDR processed outcome image of the current frame to generate a new temporary panoramic outcome image, thereby obtaining a final synthesized panoramic image. Compared to FIG. 1, in the panoramic image obtained by using the first embodiment of the present invention shown in FIG. 3, details lost in the areas of over-exposure and under-exposure in the original image are all effectively restored.

The specific implementation process of the HDR processing in the above embodiment is an existing technique in the present field and is omitted herein.

More specifically, in one possible implementation, in step S300, the exposure compensation performed on the HDR processed outcome image of the current frame based on the temporary panoramic outcome image of the previous frame can be implemented by the following steps.

In step S310, a relative motion parameter between a previous frame and a next frame is acquired.

Before exposure compensation is performed, motion estimation needs to be first performed; that is, a relative motion parameter between the two consecutive frames is acquired. The object of acquiring the relative motion parameter is to calculate a coarse overlapping area between the two consecutive frames, and a translational motion parameter between the two consecutive frames can be calculated by using an optical flow algorithm, wherein the optical flow algorithm can be used to calculate a translational motion parameter between two images and is used for a scenario having more complex texture. Alternatively, data of a rotational angular velocity of an image acquiring device and an angle of view of a single frame can be obtained, and a translational motion parameter between the two consecutive frames is then calculated according to the data of the rotational angular velocity and the angle of view of the single frame. Data of a gyroscope of a camera can acquire the rotational angle velocity of a device, whereas the angle of view of a single frame can be directly read from information of a device. Thus, the translational motion parameter can be calculated, as: translational motion parameter=(angular velocity*time)*angle of view*length of image and is used in a scene having simpler texture.

In step S320, an overlapping area between the HDR processed outcome image of the current frame and the temporary panoramic outcome image of the previous frame is calculated according to the relative motion parameter between the two consecutive frames. The overlapping area between the two images can be calculated in two steps. In the first step, a coarse overlapping area between the HDR processed outcome image of the current frame and the temporary panoramic outcome image of the previous frame is calculated according to the relative motion parameter between the two consecutive frames; in the second step, an alignment translational motion parameter between the two images is calculated based on the obtained coarse overlapping area by using a block matching algorithm to obtain a fine overlapping area between the HDR processed outcome image of the current frame and the temporary panoramic outcome image of the previous frame.

According to the result of motion estimation, the coarse overlapping area between the HDR processed outcome image of the current fame and the temporary panoramic outcome image of the previous frame can be calculated. By using a block matching algorithm, an alignment translational motion parameter can be more accurately calculated and be further used for exposure compensation and fusion. In the block matching algorithm, for an overlapping area of an image, small ranges around an overlapping area of another image are searched, the sums of absolute differences in grayscale values of corresponding pixels are calculated and averaged to obtain respective average values, and a more accurate translational motion parameter is obtained when the average value is minimum.

In step S330, the grayscale values of the overlapping area between two images are calculated, and exposure compensation is performed on the HDR processed outcome image of the current frame according to the calculation result of the grayscale values. The overlapping area herein refers to the fine overlapping area. The object of exposure compensation is to reduce the brightness discrepancy caused by the HDR processing, such that the brightness of the HDR processed outcome image can better approximate that of the normal-exposure image. There are numerous specific implementation methods, and one is given as an example below. Two accumulated sums A1 and A2 of the grayscale values of pixels of two overlapping areas are calculated, wherein A1 is the accumulated sum of the grayscale values of the pixels of a first overlapping area of the HDR processed outcome image of the current frame, and A2 is the accumulated sum of the grayscale values of the pixels of a second overlapping area of the temporary panoramic outcome image of the previous frame; and a brightness compensation value a is calculated, wherein a=A2/A1, and a brightness value of the HDR processed outcome image of the current frame is multiplied by a.

During the shooting process, only the overlapping area and a certain expanded area from the overlapping area are compensated for exposure. After the shooting ends, the compensation is performed on the uncompensated part, which can further reduce some useless calculation and improve the running speed.

Specifically, in one implementation, in step S400, performing image fusion and synthesis according to the temporary panoramic outcome image of the previous frame and the exposure compensated HDR processed outcome image of the current frame to generate the new temporary panoramic outcome image of the current frame can be implemented by the following steps.

From the overlapping area of the HDR processed outcome image of the current frame and the temporary panoramic outcome image of the previous frame, a path having a minimum accumulated sum of differences in grayscale values is identified, and linear fusion and synthesis are performed on the temporary panoramic outcome image of the previous frame and the exposure compensated HDR processed outcome image of the current frame along the path to generate the new temporary panoramic outcome image of the current frame.

Performing linear fusion along the path means that smooth translation is performed, within a width L on the right and left of the path, on the pixel values of the image, and can be expressed as: Pixel=LeftPixel*(L−x)/L+ RightPixel*x/L, where x ranges between 1 and L, L is the length of a translation area, LeftPixel is the grayscale value of a pixel of the input image (i.e., the HDR processed outcome image of the current image), and RightPixel is a grayscale value of a pixel of the temporary panoramic outcome image of the previous frame. The calculation result Pixel gets closer to LeftPixel and RightPixel as x becomes smaller.

Here, it should be additionally noted that for the first frame image in the HDR processing, the first HDR processed outcome image generated can be directly copied into the panoramic result image memory as the temporary panoramic result image of the current frame.

On the basis of the same inventive concept, a fast scan-type panoramic image synthesis device is further provided according to a second embodiment of the present invention. The device is based on the principle same as that of the foregoing method, and an operation process of the device can be realized by the process of the foregoing method and such repeated details are omitted herein.

Figure 4:
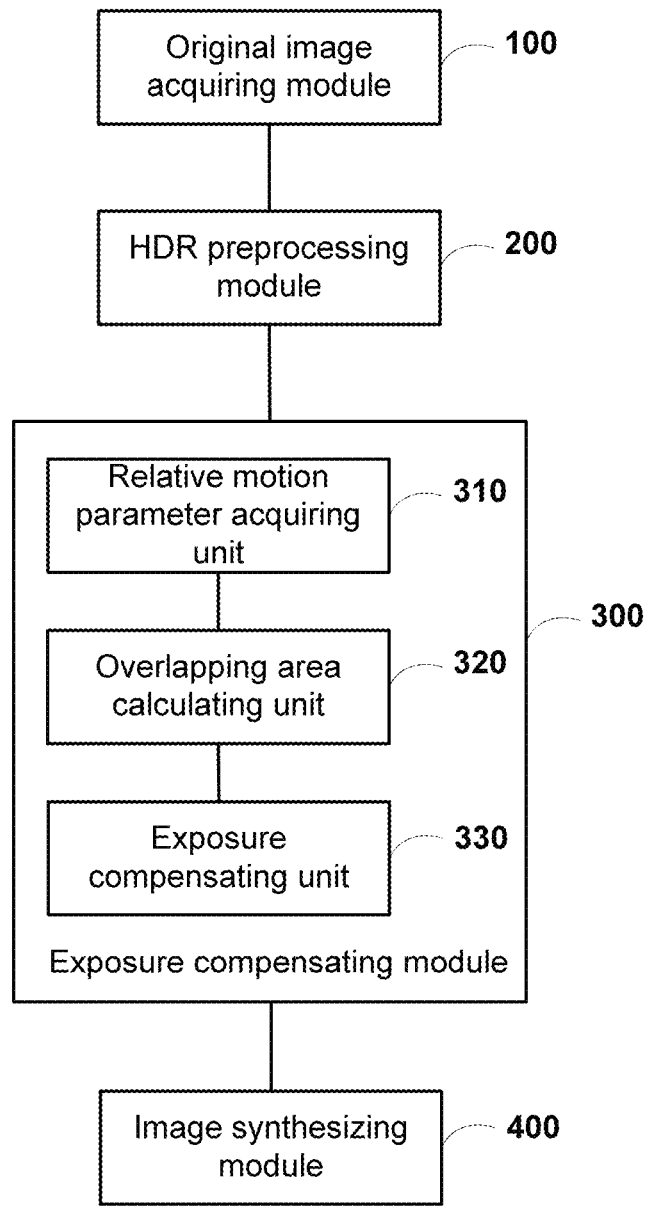
FIG. 4 is a structural schematic diagram of a fast scan-type panoramic image synthesis device provided according to a second embodiment of the present invention.

Referring to FIG. 4, a fast scan-type panoramic image synthesis device provided according to the second embodiment of the present invention includes an original image acquiring module 100, an HDR preprocessing module 200, an exposure compensating module 300 and an image synthesizing module 400.

The original image acquiring module 100 simultaneously acquires two original images of a same angle of view, wherein one is an exposure-locked image and the other is a non-exposure-locked image. The HDR preprocessing module 200 performs HDR processing on the two simultaneously acquired original image by using the exposure-locked image as a reference image to obtain an HDR processed outcome image. The exposure compensating module 300 performs, based on a temporary panoramic outcome image of the previous frame, exposure compensation on the HDR processed outcome image of a current frame. The image synthesizing module 400 performs image fusion and synthesis according to the temporary panoramic outcome image of the previous frame and the exposure compensated HDR processed outcome image of the current frame to generate a new temporary panoramic outcome image of the current frame.

The original image acquiring module 100 further controls two cameras of a same angle of view to simultaneously capture images, wherein one of the cameras is exposure-locked and the other camera is non-exposure-locked.

Further, the exposure compensating module 300 includes a relative motion parameter acquiring unit 310, an overlapping area calculating unit 320 and an exposure compensating unit 330. The relative motion parameter acquiring unit 310 acquires a relative motion parameter between two frames including a previous frame and a next frame. The overlapping area calculating unit 320 calculates an overlapping area between the HDR processed outcome image of the current frame and the temporary panoramic outcome image of the previous frame according to the relative motion parameter between the two consecutive frames. The exposure compensating unit 330 calculates grayscale values of the overlapping area on two images and performs exposure compensation on the HDR processed outcome image of the current frame according to a calculation result of the grayscale values.

Further, the relative motion parameter acquiring unit 310 adopts an optical flow algorithm to calculate a translational motion parameter between the two consecutive frames; alternatively, the relative motion parameter acquiring unit 310 acquires data of a rotational angle velocity of an image acquiring device and an angle of view of a single frame, and calculates a translational motion parameter between the two consecutive frames according to the data of the rotational angular velocity and the data of the angle of view of the single frame.

Specifically, the overlapping area calculating unit 320 calculates a coarse overlapping area between the HDR processed outcome image of the current frame and the temporary panoramic outcome image of the previous frame according to the relative motion parameter between the two consecutive frames. Further, the overlapping area calculating unit 320 calculates, based on the coarse overlapping area, an alignment translational motion parameter between the two images by using a block matching algorithm to obtain a fine overlapping area between the HDR processed outcome image of the current frame and the temporary panoramic outcome image of the previous frame.

Specifically, the exposure compensating unit 330 calculates accumulated sums A1 and A2 of grayscale values of pixels of two overlapping areas, respectively, wherein A1 is the accumulated sum of the grayscale values of the pixels of the overlapping area of the HDR processed outcome image of the current frame, and A2 is the accumulated sum of the grayscale values of the pixels of the overlapping area of the temporary panoramic outcome image of the previous frame. The exposure compensating unit 330 further calculates a brightness compensation value a, as a=A2/A1, and multiplies a brightness value of the HDR processed outcome image of the current frame by a.

In one possible implementation, the image synthesizing module 400 identifies, from the overlapping area of the HDR processed outcome image of the current frame and the temporary panoramic outcome image of the previous frame, a path having a minimum accumulated sum of differences in grayscale values, and performs linear fusion and synthesis on the temporary outcome image of the previous frame and the exposure compensated HDR processed outcome image of the current frame along the path to generate the new temporary panoramic outcome image of the current frame.

On the basis of the same inventive concept, a fast scan-type panoramic image synthesis device is provided according to a third embodiment of the present invention. The fast scan-type panoramic image synthesis device includes a memory, a processor, and a computer program stored in the memory and executable on the processor. The steps of the method of any implementation of the above method are implemented when the processor executes the computer program.

Moreover, the fast scan-type panoramic image synthesis device further includes two cameras connected to the processor. The two cameras have the same angle of view when acquiring the original images, wherein one of the cameras is exposure-locked and the other is non-exposure-locked.

On the basis of the same inventive concept, a fast scan-type panoramic image synthesis device is provided according to a fourth embodiment of the present invention. The fast scan-type panoramic image synthesis device includes computer-readable storage medium having a computer program stored therein. The steps of the method of any implementation of the above method are implemented when the computer program is executed by a processor.

In the fast scan-type panoramic image synthesis method and device of the present invention, HDR processing is performed by using an image obtained by an exposure locked camera as a reference image for an HDR algorithm, so as to maintain the consistency in brightness with an HDR processed outcome image of an adjacent frame. As such, a drawback of a conventional HDR algorithm, in which brightness inconsistency from an HDR outcome image of an adjacent frame is caused when one input image is selected as a reference image according to one evaluation standard, is overcome. Further, exposure compensation is performed on an HDR processed outcome image before image fusion to reduce a brightness discrepancy caused by the HDR processing. Lastly, image fusion and synthesis are performed according to a temporary panoramic outcome image of a previous frame and an exposure compensated HDR processed outcome image of a current frame to generate a new temporary panoramic outcome image of the current frame, thereby obtaining a final synthesized panoramic image.

One example of the present invention is performing HDR preprocessing by using an exposure-locked original image as a reference image to obtain an HDR processed outcome image, the HDR processed outcome image is used as an input image and is synthesized to generate a panoramic image, and exposure compensation is performed on the input image before subsequent image fusion is performed, so as to reduce the brightness discrepancy caused by the HDR processing. With the present invention, details lost in areas of over-exposure and under-exposure in an original image can be effectively recovered, so as to avoid the issues of loss of image details in a panoramic outcome image caused by locked exposure.

Further, the fast scan-type panoramic image synthesis method and device of the present invention are applicable to synthesis of video having stable exposure. Video software built-in a cellphone camera usually does not provide exposure locking, and brightness can drastically fluctuate during video recording. Using the technical solution of the present invention, an exposure-locked image can be used as a reference image and be synthesized by an HDR algorithm with a non-exposure-locked image that is simultaneously acquired, and a synthesis result can then be encoded to obtain video with stable exposure while preserving image details.

While the invention has been described by way of the above preferred embodiments, it is to be understood that the invention is not limited thereto. Possible variations and modifications can be made by a person skilled in the art to the technical solution of the present invention on the basis of the disclosed method and technical contents without departing from the spirit and scope of the present invention. Therefore, simple modifications, equivalent changes and amendments made to the above embodiments according to technical substantiality of the present invention without departing from the content of the technical solution of the present invention are to be encompassed within the scope of the technical solution of the present invention.

What is claimed is:

1. A fast scan-type panoramic image synthesis method, comprising steps of:
    simultaneously acquiring two original images of a same angle of view, wherein one of the two original images is an exposure-locked image and the other is a non-exposure-locked image;
    performing a high dynamic range (HDR) process on the simultaneously acquired two original images by using the exposure-locked image as a reference image to obtain an HDR processed outcome image of a current frame;
    performing exposure compensation on the HDR processed outcome image of the current frame based on a temporary panoramic outcome image of a previous frame before image fusion; and
    performing image fusion and synthesis according to the temporary panoramic outcome image of the previous frame and the exposure compensated HDR processed outcome image of the current frame to generate a new temporary panoramic outcome image of the current frame,
    wherein the step of performing exposure compensation on the HDR processed outcome image of the current frame based on the temporary panoramic outcome image of the previous frame comprises steps of:
        acquiring a relative motion parameter between frames;
        calculating an overlapping area between the HDR processed outcome image of the current frame and the temporary panoramic outcome image of the previous frame according to the relative motion parameter between the two frames; and
        calculating grayscale values of the overlapping area between the two images and performing exposure compensation on the HDR processed outcome image of the current frame according to a calculation result of the grayscale values.

2. The fast scan-type panoramic image synthesis method according to claim 1, wherein the step of simultaneously acquiring the two original images of the same angle of view, wherein one of the two original images is the exposure-locked image and the other is the non-exposure-locked image, comprises a step of:
    controlling two cameras of the same angle of view to simultaneously acquire the two original images, wherein one of the cameras is exposure-locked and the other camera is non-exposure-locked.

3. The fast scan-type panoramic image synthesis method according to claim 1, wherein the step of acquiring the relative motion parameter between the two frames comprises a step of:
    calculating a translational motion parameter between the two frames by using an optical flow algorithm; or
    acquiring data of a rotational angular velocity of an image acquiring device and an angle of view of a single frame and calculating the translational motion parameter between the two frames according to the data of the rotational angular velocity and the angle of view of the single frame.

4. The fast scan-type panoramic image synthesis method according to claim 1, wherein the step of calculating the overlapping area between the HDR processed outcome image of the current frame and the temporary panoramic outcome image of the previous frame according to the relative motion parameter between the two frames comprises:
    calculating a coarse overlapping area between the HDR processed outcome image of the current frame and the temporary panoramic outcome image of the previous frame according to the relative motion parameter between the two frames; and
    calculating, based on the obtained coarse overlapping area, an alignment translational motion parameter between the two images by using a block matching algorithm to obtain a fine overlapping area between the HDR processed outcome image of the current frame and the temporary panoramic outcome image of the previous frame.

5. The fast scan-type panoramic image synthesis method according to claim 1, wherein the step of calculating the grayscale values of the overlapping area between the two images, and performing exposure compensation on the HDR processed outcome image of the current frame according to the calculation result of the grayscale values comprises steps of:
    calculating accumulated sums A1 and A2 of the grayscale values of pixels of two overlapping areas, respectively, wherein A1 is an accumulated sum of the grayscale values of the pixels of a first overlapping area of the HDR processed outcome image of the current frame and A2 is an accumulated sum of the grayscale values of the pixels of a second overlapping area of the temporary panoramic outcome image of the previous frame; and calculating a brightness compensation value a, as a=A2/A1, and multiplying a brightness value of the HDR processed outcome image of the current frame by a.

6. The fast scan-type panoramic image synthesis method according to claim 1, wherein the step of performing image fusion and synthesis according to the temporary panoramic outcome image of the previous frame and the exposure compensated HDR processed outcome image of the current frame to generate the new temporary panoramic outcome image of the current frame comprises a step of:

identifying, from an overlapping area of the HDR processed outcome image of the current frame and the temporary panoramic outcome image of the previous frame, a path having a minimum accumulated sum of differences in the grayscale values, and performing linear fusion and synthesis on the temporary panoramic outcome image of the previous frame and the exposure compensated HDR processed outcome image of the current frame along the path to generate the new temporary panoramic outcome image of the current frame.

7. A fast scan-type panoramic image synthesis device, comprising an original image acquiring module and an image processor, wherein, the original image acquiring module controls two cameras of a same angle of view to simultaneously acquire two original images of the same angle of view, wherein one of the two original images is an exposure-locked image and the other of the two original images is a non-exposure-locked image;

the image processor performs HDR processing on the simultaneously acquired two original images by using the exposure-locked image as a reference image to obtain an HDR processed outcome image of a current frame;

the image processor performs exposure compensation on the HDR processed outcome image of the current frame based on a temporary panoramic outcome image of the previous frame before image fusion; and the image processor performs image fusion and synthesis according to the temporary panoramic outcome image of the previous frame and the exposure compensated HDR processed outcome image of the current frame to generate a new temporary panoramic outcome image of the current frame, the image processor acquires a relative motion parameter between frames;

the image processor calculates an overlapping area between the HDR processed outcome image of the current frame and the temporary panoramic outcome image of the previous frame according to the relative motion parameter between the two frames; and the image processor calculates grayscale values of the overlapping area between the two images and performing exposure compensation on the HDR processed outcome image of the current frame according to a calculation result of the grayscale values.

8. The fast scan-type panoramic image synthesis device according to claim 7, wherein one of the two cameras is exposure-locked and the other of the two cameras is non-exposure-locked.

9. The fast scan-type panoramic image synthesis device according to claim 7, wherein the image processor calculates a translational motion parameter between the two frames by using an optical flow algorithm; or acquires data of a rotational angular velocity of an image acquiring device and an angle of view of a single frame, and calculates the translational motion parameter between the two frames according to the data of the rotational angular velocity and the angle of view of the single frame.

10. The fast scan-type panoramic image synthesis device according to claim 7, wherein the image processor calculates a coarse overlapping area between the HDR processed outcome image of the current frame and the temporary panoramic outcome image of the previous frame according to the relative motion parameter between the two frames, and calculates, based on the obtained coarse overlapping area, an alignment translational motion parameter between the two images by using a block matching algorithm to obtain a fine overlapping area between the HDR processed outcome image of the current frame and the temporary panoramic outcome image of the previous frame.

11. The fast scan-type panoramic image synthesis device according to claim 7, wherein the image processor calculates accumulated sums A1 and A2 of the grayscale values of pixels of two overlapping areas, respectively, wherein A1 is an accumulated sum of the grayscale values of the pixels of a first overlapping area of the HDR processed outcome image of the current frame and A2 is an accumulated sum of the grayscale values of the pixels of a second overlapping area of the temporary panoramic outcome image of the previous frame, and calculates a brightness compensation value a, as a=A2/A1, and multiplying a brightness value of the HDR processed outcome image of the current frame by a.

12. The fast scan-type panoramic image synthesis device according to claim 7, wherein the image processor identifies, from an overlapping area of the HDR processed outcome image of the current frame and the current temporary panoramic outcome image of the previous frame, a path having a minimum accumulated sum of differences in the grayscale values, and performs linear fusion and synthesis on the temporary panoramic outcome image of the previous frame and the exposure compensated HDR processed outcome image of the current frame along the path to generate the new temporary panoramic outcome image of the current frame.

13. A fast scan-type panoramic image synthesis device, comprising a memory, a processor, and a computer program stored in the memory and executable on the processor, wherein the steps of the method of claim 1 are implemented when the processor executes the computer program.

14. The fast scan-type panoramic image synthesis device according to claim 13, further comprising two cameras connected to the processor; wherein, the two cameras have a same angle of view when capturing the original images, and one of the cameras is exposure-locked and the other is non-exposure-locked.

15. A fast scan-type panoramic image synthesis device comprising a non-transitory computer-readable storage medium, the computer-readable storage medium having a computer program stored therein, wherein the steps of the method of claim 1 are implemented when the computer program is executed by a processor.

* * * * *